Figure 1:
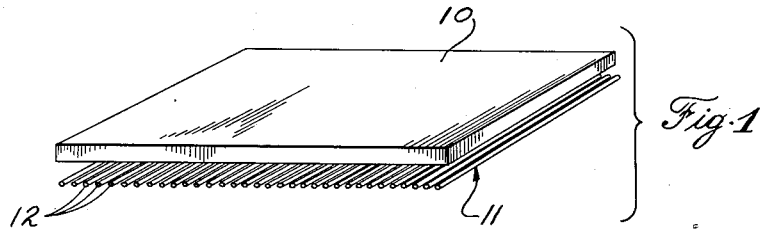

April 15, 1952     J. B. BRENNAN     2,592,789
SCREEN STENCIL

Filed Feb. 15, 1946     2 SHEETS—SHEET 1

INVENTOR.
JOSEPH B. BRENNAN
BY
Bosworth + Sessions
ATTORNEYS

April 15, 1952     J. B. BRENNAN     2,592,789
SCREEN STENCIL

Filed Feb. 15, 1946     2 SHEETS—SHEET 2

INVENTOR.
JOSEPH B. BRENNAN
BY
Bosworth + Sessions
ATTORNEYS

Patented Apr. 15, 1952

2,592,789

UNITED STATES PATENT OFFICE 2,592,789

SCREEN STENCIL

Joseph B. Brennan, Bratenahl, Ohio, assignor to
E. D. McCurdy, trustee

Application February 15, 1946, Serial No. 647,888

7 Claims. (Cl. 101—128.2)

This invention relates to screen stencils and methods of making same and constitutes a continuation in part of a copending application of Joseph B. Brennan and Emma Leona Marsh, Serial No. 414,566, filed October 11, 1941, now Patent No. 2,395,448, issued Feb. 26, 1946. The invention pertains to screen stencils and screen stencil blanks composed entirely of durable materials such as the metals and other inorganic materials described and claimed in Patent No. 2,213,237. The aforesaid parent application relates particularly to efficient and economical methods of producing designs in screen stencils composed of metals or inorganic materials by photographic processes. The present application is directed particularly to screen stencils and screen stencil blanks in which the screens are composed of unwoven, substantially parallel filaments, rather than the customary woven material.

Screen stencils composed of durable materials such as metals, thermosetting plastics and the like are advantageous in that they are not affected by solvents such as water, alcohol, ether, benzene, carbon tetrachloride and the like which are used as vehicles for pigments and dies of various sorts, and further, the screens do not change in size with variations in atmospheric conditions. The term "durable materials" is used hereafter to refer to materials such as those noted above which are insoluble and not subject to swelling in water and organic solvents. As distinguished from such durable screens, the usual silk screen stencil embodies a design of sensitized gelatin or similar material which is susceptible to atmosphere changes. The designs are of colloidal nature and the accuracy of the designs is not only decreased by mechanical wear during use, but the colloidal filaments vary with changes in temperature and humidity, thus the stencils are useable for limited periods only and are only slightly resistant to water. The screen stencils of the present invention are comparatively indestructible and do not have the limiting features of the colloid screens. More particularly the screen stencils embodying parallel unwoven filaments as described herein have advantages with respect to increased flatness of the stencil surfaces over screen stencils embodying woven screens, may be formed to conform to curved or irregular surfaces more readily than some types of woven screens, and have advantages in economy of manufacture because the weaving of the screens is eliminated.

Figure 2:
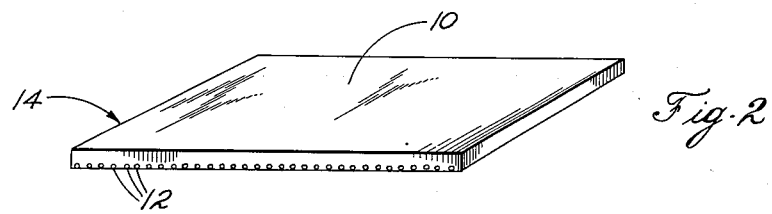
Figure 3:
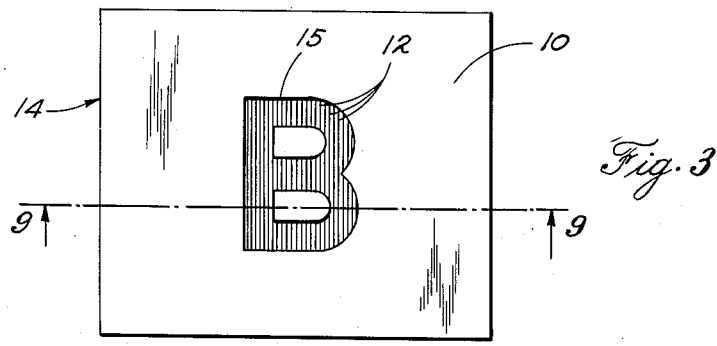
Figure 4:
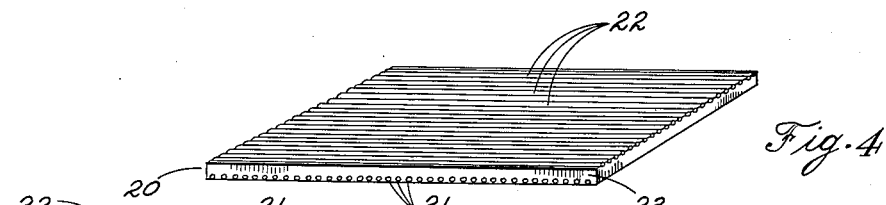
Figure 5:
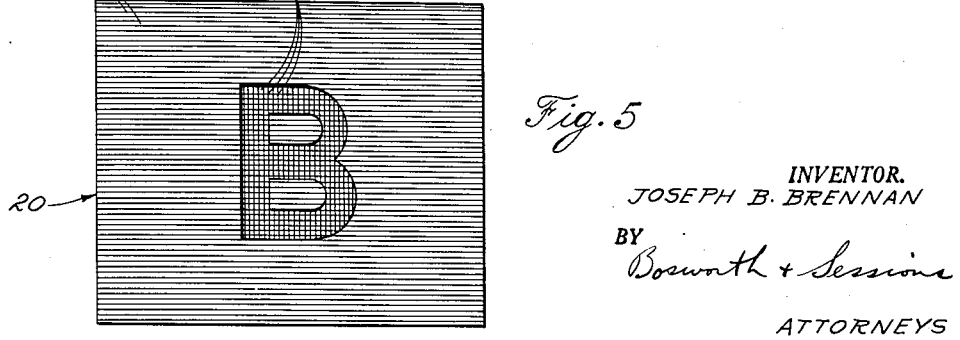
Figure 6:
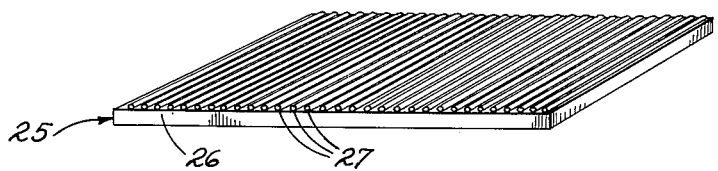
Figure 7:
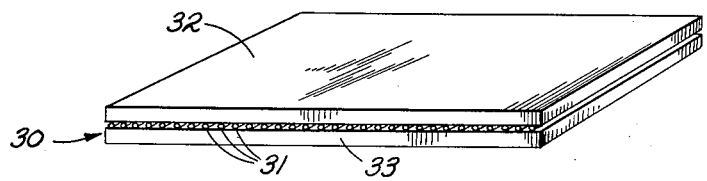
Figure 8:
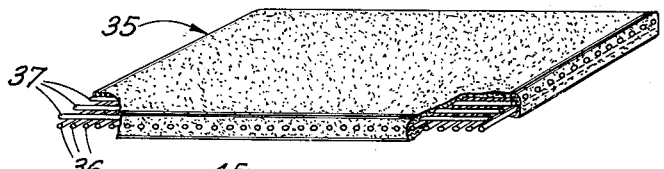

Referring to the drawings, in which the invention is illustrated somewhat diagrammatically and with the thickness of the parts exaggerated and not to scale, Figure 1 is an enlarged cross-sectional view of a metal layer and a screen composed of unwoven filaments prior to assembly; Figure 2 is a view of the metal layer and screen of Figure 1 joined together; Figure 3 is a plan view of a screen stencil such as may be produced from the plate of Figure 2; Figure 4 illustrates a modified form of screen stencil plate embodying two layers of substantially parallel filaments; Figure 5 is a plan view of a screen stencil such as may be produced from the plate of Figure 4; Figures 6, 7 and 8 diagrammatically illustrate further modifications of my screen stencil plates, all of which embody screens composed of substantially parallel unwoven filaments; and Figures 9, 10, 11, 12 and 13 illustrate steps in a preferred process of etching designs into metal stencil plates, the figures being sections similar to the section indicated by line 9—9 of Figure 3, on an enlarged scale.

Perhaps the simplest form of screen stencil embodying the present invention is illustrated in Figures 1 to 3. As shown in Figure 1, I may make a screen stencil plate by providing a sheet 10 composed of a comparatively soft metal and a layer 11 made up of a plurality of wires 12 or other filaments arranged with their axes substantially parallel and spaced at the required distance to produce the desired screen effect. For example, in a screen intended for applying designs to glass ware, I may employ a sheet of aluminum foil having a thickness of about .005 inch and stainless steel wires of a diameter of .002 inch and spaced apart about .020 inch on centers. The wires are preferably held taut and then the wires and juxtaposed sheet 10 are placed in a suitable press and subjected to pressure to embed them in the sheet, thus producing the screen stencil blank indicated in general at 14 in Figure 2. The metal sheet not only blocks the spaces between the parallel wires, but also holds the wires in correct position. The wires, in turn, reinforce and strengthen the sheet. Figure 3 shows the screen stencil blank 14 with a design 15 etched therein. The etching process, which will be described in greater detail below, removes the aluminum from the plate without affecting the stainless steel wires. Thus in the region of the design, the wires 12 are exposed whereas the metal of the plate 10 has been removed.

Figure 4 illustrates a modified form of screen stencil plate 20 made up of two layers of parallel wires 21 and 22, the wires 21 extending substantially at right angles to the wires 22 and the wires being embedded into opposite sides of the metal plate 23. Here the wires may be of the same size as described above, but with such an arrangement the metal plate is preferably of somewhat greater thickness. For example, for a screen stencil intended for the same purposes as that shown in Figures 1 to 3, a plate of .005 to .010 inch in thickness may be employed.

When a design is etched into such a screen stencil the appearance is somewhat as shown in Figure 5. Here the wires 21 and 22 both extend across the areas of the design from which the metal of the plate 23 has been removed. The upper wires 22 are visible as lines in the surface screen stencil plate as they are not entirely covered over by the embedding operation.

Figure 6 shows a screen stencil plate 25 made up of a metallic sheet 26 to which a layer composed of parallel wires 27 is secured. In this instance, the wires are welded to the plate rather than being embedded therein. Figure 7 shows a screen stencil plate 30 of generally similar construction except that the parallel wires here are disposed between metal plates 32 and 33 to which the wires are welded.

In Figure 8 the screen stencil plate 35 is made up of two layers of substantially parallel wires 36 and 37, the wires 36 being substantially at right angles to the wires 37. In this modification, the spaces between the wires are filled by spraying molten metal, by the well-known metallizing process for example, onto the two layers of wires assembled together in superposed relationship. The molten metal penetrates the spaces and forms a substantially impervious layer which also bonds the layers of wire together. The spraying operation preferably is carried out from both sides of the assembled layers of wires and, if desired, the assembly may be subjected to heat and pressure after the spraying operation is completed in order to flatten the sheet, smooth the surfaces and increase the density of the spray deposited metal. Also, the surfaces may be smoothed by grinding, polishing, machining or the like.

In each instance in producing plates in which the design is to be etched, I employ metals of different characteristics for the filling-in metal and for the wires so that the filling-in metal can be etched away without etching the wires. Completed stencils corresponding to the plates shown in Figures 6, 7 and 8 are not illustrated herein inasmuch as the appearance of the designs in plates such as shown in Figures 6 and 7 is quite similar to the appearance of the design in Figure 3, and the appearance of the design in a plate made according to Figure 8 is similar to the appearance of the design shown in Figure 5.

Those skilled in the art will appreciate that various other combinations may be employed. For example, the spraying method of assembly may be employed with only a single layer of wires if desired, and two layers of wires at right angles to each other may be utilized on opposite sides of the metal sheets in stencils made in accordance with Figures 6 and 7.

Preferably the designs are etched in the sheets by the method claimed in my above parent application and illustrated diagrammatically in Figures 9 to 13, inclusive. The method is described herein as applied to etching the design 15 in the plate 14 of Figure 2. No substantial changes are required to adapt the method to the other forms of plates illustrated herein.

Figure 9:

The first step of the process consists in roughening the smooth surface of the plate 14 as indicated at 45 in Figure 9. This roughening or graining may be accomplished by various methods such as etching or sandblasting or graining. The roughened surface is then cleaned by any familiar cleaning method as very dilute acid and water wash, preparatory to producing a design on the metal screen.

Next, a sensitized colloidal layer of bichromated albumen, gelatin or similar material 46 may be applied to the roughened surface 45, dried as with a fan at room temperature and exposed to a light source to produce the desired image which is further treated with a greasy ink in turpentine to make the image more water-resistant.

Figure 10:
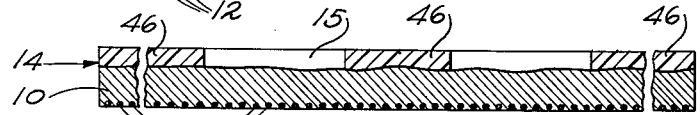
Figure 11:
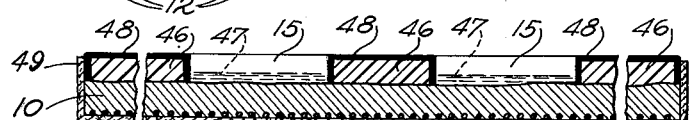

The unexposed portions of the sensitized colloid are removed with a developer leaving the design 15 in the colloid as shown in Figure 10. The remaining portions of the colloid resist are then dried. After producing an image on the roughened surface, the uncovered areas of the metal are kept in a condition in which they are receptive to the etching solution by applying an etchant absorber or accelerator 47, see Figure 11, on the surface of the metal from which the unexposed portions of the sensitized colloid have been removed. For example, a solution of a polyhydric alcohol and a salt which is sufficiently hygroscopic to maintain a wetted surface may be applied, the greasy material on the image preventing this solution from adhering thereto. Next, a greasy ink 48 is applied as by means of a transfer roller to the treated surface, the etchant accelerator repelling the ink from the exposed metal surfaces and allowing the ink to be absorbed only by the remaining colloid design. The greasy ink completely penetrates the photographic image so that it is thoroughly protected, by the etchant resistant ink applied thereto, against the encroachment of the etchant. A coating of wax 49 is then applied to protect the underside and the edges of the metal structure during the etching.

The uncovered portions of the metal surface are removed by immersing in an etching solution which will not react with the metallic wires, preferably consisting of a metallic salt to which an acid may be added. A salt of a metal below the metal to be etched in the electro-chemical series can be used in a solution having a pH less than 7. For example, a solution of 30 gms. copper sulfate and 150 cc. hydrochloric acid made up to 1 liter with water, or a solution of copper chloride, may be used as the etchant with aluminum or tin sheets. During the etching process the metal of the etching salt replaces the metal on the surface being etched, this metal being deposited in small globules. These globules of copper, if a copper salt is the etchant, may be removed by a chemical such as nitric acid which readily reacts with the copper but will not react with the metal being etched. The reactions involved in etching the stencil give satisfactory results at room temperature or slightly above room temperature.

The uncovered metal can also be removed electrolytically at a current density of .5 ampere per 100 sq. cm., or less. I have found a wide variation of electrolytes can be used including acid halogen salts, acid halogen salts and an acid, acid salts and a halogen acid, neutral halogen salts, neutral halogen salts and an acid, neutral salts and a halogen acid, ammonium halogen salt, and ammonium halogen salt and ammonium hydroxide to produce an alkaline solution.

Figure 12:
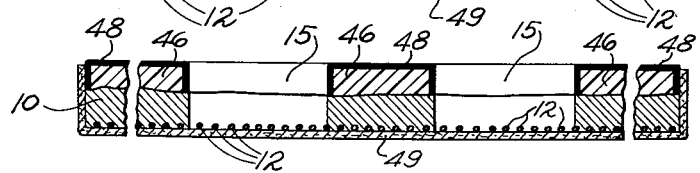
Figure 13:
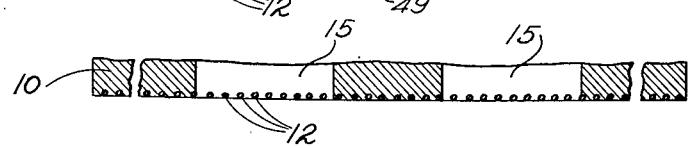

Figure 12 shows the screen stencil after etching out the unprotected metal. The design is accurately reproduced, for the resist, impregnated with the greasy ink, is able to withstand the action of the etchant so that the stencil can be etched all the way through in a single operation. After etching, the stencil is rinsed in gasoline, benzene, carbon tetrachloride or similar solvent to remove the wax and most of the greasy ink. The stencil is then washed in warm water to produce a clean completed screen stencil as shown in Figures 3 and 13. A small amount of denaturated alcohol added to the water will facilitate the washing of the screen stencil after etching.

As noted above, the designs can be incorporated in the screen stencils by methods other than the etching methods just described. For example, a design cut out of metal or other suitable durable material may be attached to a screen by embedding the wires of the screen into the material of the design, or in the case of a metal by soldering or welding the parallel wires to the design. One or more layers of wires may be employed. A suitable method for applying such a design to a screen is described in greater detail and claimed in Patent No. 2,316,768, issued April 20, 1943.

A parallel wire screen composed of either one or two layers of wire may also be filled in with a design by metal spraying, using a stencil to protect those portions of the screen which are not to be filled in with metal. Similarly, a parallel wire screen may be filled in with powdered metal which is then sintered in place, or may be filled in with a powdered plastic material such as a thermosetting resin powder and thereafter bonded or cured by heat and pressure, these last methods being described and claimed in my application Serial No. 579,635, filed February 24, 1945 now Patent No. 2,573,951, dated November 6, 1951. Stencils made by any of these methods have substantially the same appearance, in plan, as those shown in Figures 3 and 5, depending upon whether one or two layers of wires are employed.

With all of the arrangements disclosed herein, the diameter and spacing of the filaments and thickness of the filling-in material may be varied widely depending upon the materials being decorated, the amount of material which it is desired to deposit and other factors; the sizes herein are given only by way of example of a typical application. However, I prefer that the plates and wires be thin enough to be quite flexible so that in use they can conform to irregularities in the surfaces to be decorated.

The parallel wire screens made by any of the above described methods may be used either in flat form or shaped to conform to an irregular object. In most instances, it will be more convenient to shape the screen stencil after the screen has been filled in and preferably after the design has been incorporated therein. However, for some purposes and where there is great irregularity in the object to be decorated, it may be desirable simultaneously to shape the screen and the sheet metal and embed the screen in the metal by means of a mold or die of the desired configuration, or to shape the screen to the desired configuration and thereafter fill it in.

Those skilled in the art will appreciate that various changes and modifications can be made in my invention without departing from the spirit and scope thereof. It is therefore to be understood that my patent is not limited to the preferred form of my invention disclosed herein or in any manner other than by the scope of the appended claims.

I claim:

1. A thin flexible screen stencil blank adapted to have a design etched therethrough comprising a composite sheet of durable material of uniform thickness comprising a layer of spaced, unwoven, substantially parallel filaments of a diameter on the order of .002 inch with the spaces between the filaments blocked by a substantially imperforate layer of etchable material.

2. A thin flexible screen stencil blank adapted to have a design etched therethrough comprising a layer of spaced, unwoven, substantially parallel metallic wires of a diameter on the order of .002 inch with the spaces between the wires blocked by a layer of dissimilar metal soluble in an etching solution not affecting said wires.

3. A screen stencil blank according to claim 2 wherein two layers of wires are employed, the wires in one layer extending at an angle to the wires in the other layer.

4. The stencil blank of claim 1 including a resist overlying at least a portion of the area of the blank.

5. The stencil blank of claim 3 including a resist overlying at least a portion of the area of the blank.

6. The construction of claim 1 in which a portion of the etchable material is removed to provide a design, the filaments extending throughout the area of the design.

7. A screen stencil according to claim 6 wherein two layers of parallel filaments are employed, the filaments in one layer extending at an angle to the filaments in the other layer.

JOSEPH B. BRENNAN.

REFERENCES CITED

The following references are of record in the file of this patent:

UNITED STATES PATENTS

| Number | Name | Date |
|---|---|---|
| 1,280,908 | Wales | Oct. 8, 1918 |
| 1,586,927 | Wilkinson | June 1, 1926 |
| 1,628,759 | Worrall | May 17, 1927 |
| 2,025,457 | Kavanaugh | Dec. 24, 1935 |
| 2,213,237 | Brennan | Sept. 3, 1940 |
| 2,288,020 | Noland | June 30, 1942 |
| 2,338,091 | Brennan | Jan. 4, 1944 |
| 2,395,448 | Brennan | Feb. 26, 1946 |